United States Patent
Suzuki

(10) Patent No.: US 11,310,144 B2
(45) Date of Patent: Apr. 19, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Takafumi Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 51 days.

(21) Appl. No.: 15/930,642

(22) Filed: May 13, 2020

(65) Prior Publication Data

US 2021/0105203 A1 Apr. 8, 2021

(30) Foreign Application Priority Data

Oct. 7, 2019 (JP) .............................. JP2019-184627

(51) Int. Cl.
*H04W 72/04* (2009.01)
*H04L 5/00* (2006.01)
*H04L 45/02* (2022.01)
*H04L 45/00* (2022.01)

(52) U.S. Cl.
CPC .............. *H04L 45/02* (2013.01); *H04L 45/46* (2013.01)

(58) Field of Classification Search
None
See application file for complete search history.

(56) References Cited

U.S. PATENT DOCUMENTS

| | | | |
|---|---|---|---|
| 6,831,918 B1* | 12/2004 | Kavak | H04Q 11/0478 370/395.52 |
| 8,965,816 B2 | 2/2015 | Okamoto | |
| 9,690,969 B2 | 6/2017 | Okamoto | |
| 10,362,102 B2 | 7/2019 | Okamoto | |
| 10,548,181 B2* | 1/2020 | Siomina | H04W 24/10 |
| 2003/0204273 A1* | 10/2003 | Dinker | H04L 41/12 700/48 |
| 2012/0120949 A1* | 5/2012 | Raghuraman | H04L 45/04 370/389 |
| 2013/0053545 A1* | 2/2013 | Young | G16B 5/00 530/350 |
| 2014/0258771 A1* | 9/2014 | Xie | G06F 11/2023 714/4.11 |
| 2019/0034517 A1* | 1/2019 | Byrd | G06F 17/40 |

FOREIGN PATENT DOCUMENTS

| | | |
|---|---|---|
| JP | 2013-168127 A | 8/2013 |
| JP | 2016-29526 A | 3/2016 |
| JP | 6511971 B2 | 5/2019 |

\* cited by examiner

*Primary Examiner* — Sai Aung
(74) *Attorney, Agent, or Firm* — Oliff PLC

(57) ABSTRACT

An information processing apparatus includes a processor configured to acquire information regarding multiple transient states of a network including multiple nodes when the network undergoes clustering in which the multiple nodes are classified into multiple clusters. The multiple transient states each represent a transient state of the network on a way to a final result of the clustering. The processor is also configured to determine a common node by using the information regarding the acquired multiple transient states. The common node is used in the clustering in the multiple transient states.

20 Claims, 8 Drawing Sheets

$$T = \begin{pmatrix} 0 & 1/3 & 0 & 1/4 & 0 & 0 & 0 \\ 1/2 & 0 & 1/2 & 1/4 & 0 & 0 & 0 \\ 0 & 1/3 & 0 & 1/4 & 0 & 0 & 0 \\ 1/2 & 1/3 & 1/2 & 0 & 1/3 & 0 & 0 \\ 0 & 0 & 0 & 1/4 & 0 & 1/2 & 1/2 \\ 0 & 0 & 0 & 0 & 1/3 & 0 & 1/2 \\ 0 & 0 & 0 & 0 & 1/3 & 1/2 & 0 \end{pmatrix}$$

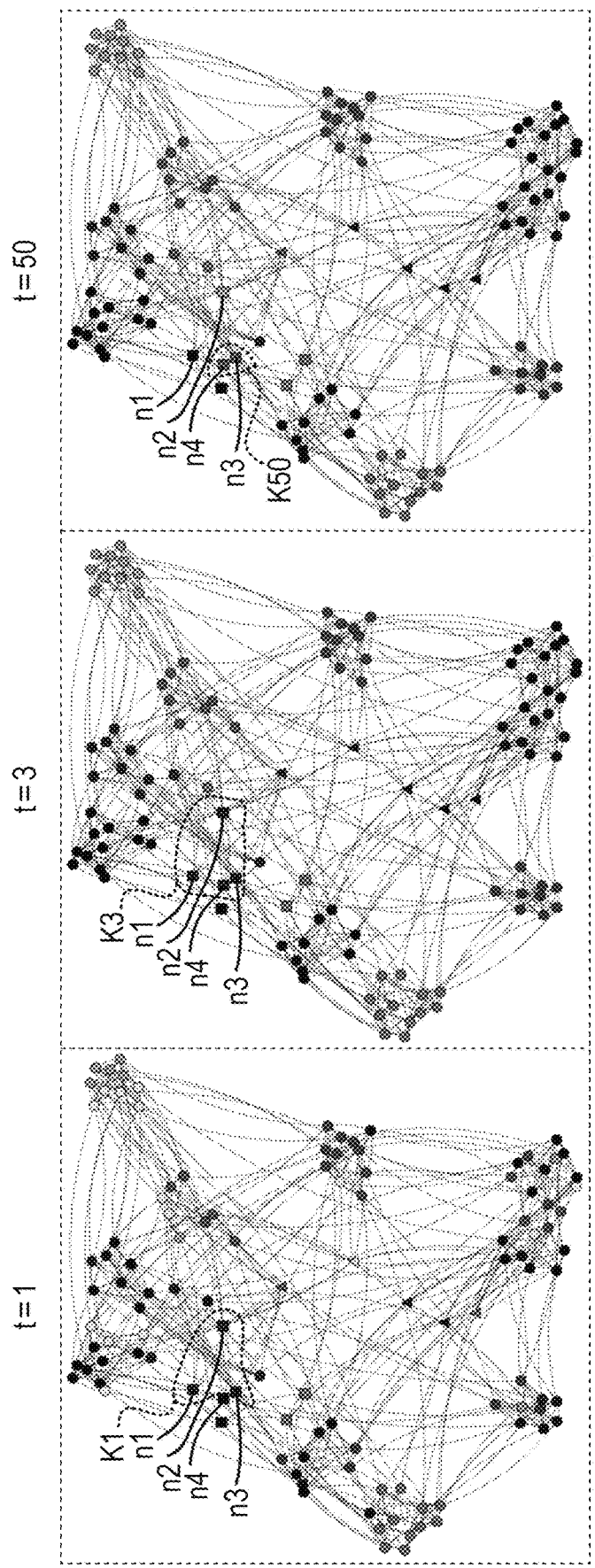

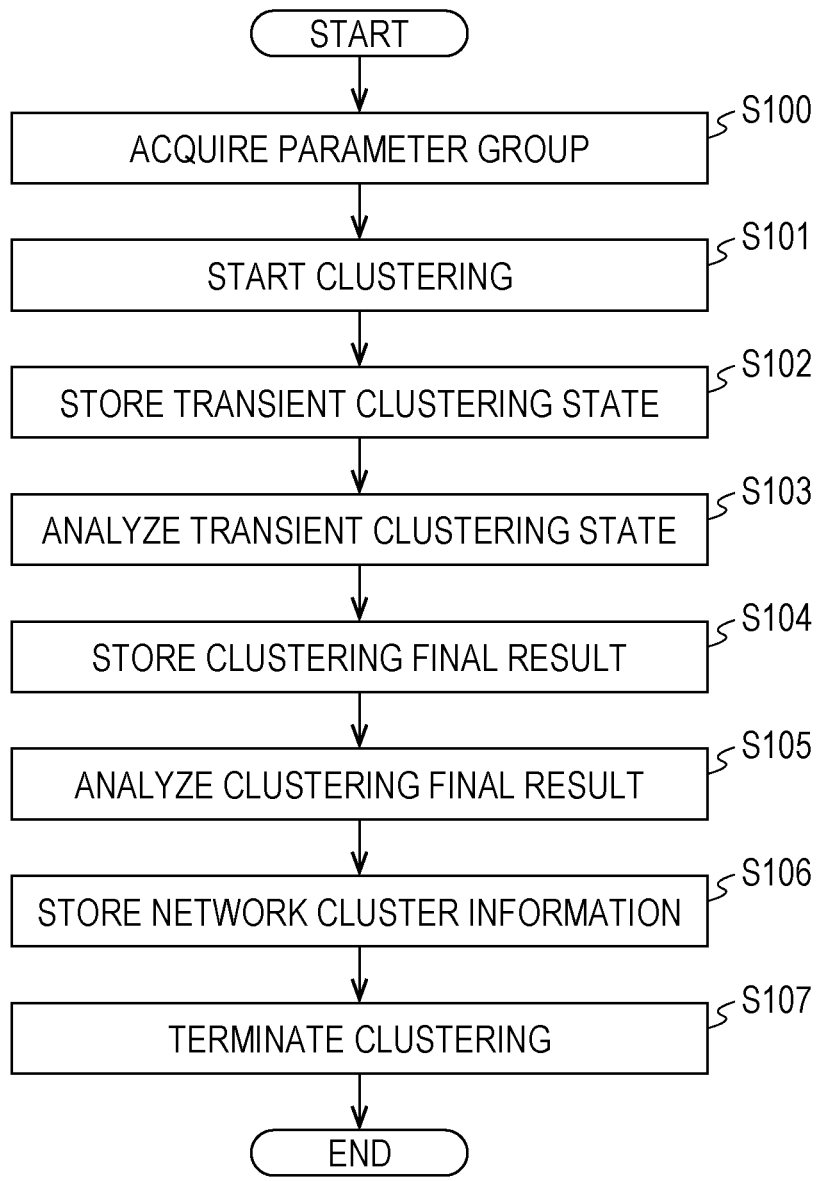

FIG. 8

1. INITIALIZE PARAMETERS $p^{(0)}$, $\alpha^{(1)}$, AND $\eta^{(1)}$ OF PROBABILITY MODEL
2. for TIME $t=1, 2, \ldots, T_{step}$
3. INITIALIZE PROBABILITY VARIABLES $z^{(t)}$, $p^{(t)}$, AND $\pi^{(t)}$
4. for SAMPLING $s=1, 2, \ldots, S$
5. for $k=1, 2, \ldots, K$
6. SAMPLE CLASSIFICATION PROPORTION (PROBABILITY DISTRIBUTION) $p^{(t)}(\cdot|k)$ FROM DIRICHLET DISTRIBUTION OF PARAMETER $\alpha^{(t)}(\cdot|k)+(\tau z)^{(t)}_{\cdot k}$
7. for $d=1, 2, \ldots, D$
8. SAMPLE DEGREE OF IMPORTANCE (MIXING PROBABILITY DISTRIBUTION) $\pi^{(t)}_{dk}$ FROM DIRICHLET DISTRIBUTION OF PARAMETER $\eta^{(t)}+z^{(t)}_{dk}$
9. SAMPLE ELEMENT $k$ OF LATENT VARIABLE $z^{(t)}_{dk}$ FROM CATEGORICAL DISTRIBUTION OF CLUSTER BELONGING PROBABILITY $\gamma^{(t)}_{dk}$
10. ESTIMATE PROBABILITY DISTRIBUTION (WHERE $p^{(t)}_s$ IS INSTANCE IN SAMPLE $s$)
11. UPDATE HYPER PARAMETERS $\alpha^{(t+1)}$ AND $\eta^{(t+1)}$ TO MAXIMIZE LIKELIHOOD FUNCTION
12. STORE $p^{(t)}$, $\alpha^{(t+1)}$, AND $\eta^{(t+1)}$ AS INFORMATION REGARDING TRANSIENT STATE AT TIME $t$

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-184627 filed Oct. 7, 2019.

BACKGROUND

(i) Technical Field

The present disclosure relates to an information processing apparatus and a non-transitory computer readable medium.

(ii) Related Art

For example, Japanese Unexamined Patent Application Publication No. 2013-168127 describes a program for rapidly performing a search based on the personalized PageRank algorithm using a query from a user. The program causes a computer to function as a learning data acquiring unit, a memory, a search condition receiving unit, a cluster extracting unit, a partial network cutting unit, and an importance calculating unit. The learning data acquiring unit acquires learning data. The memory stores attribution degree information obtained in the following manner. Machine learning is performed using the learning data about cluster division where Markov chains of transition via a link from a node to a node on a network are divided into multiple clusters each of which is indicated by a biased Markov chain. The network is formed from multiple nodes and multiple links connecting the multiple nodes to each other. A stationary state of each biased Markov chain indicating each cluster of the learning result is calculated and obtained. The attribution degree information indicates an attribution degree of each node on the network to each cluster of the learning result. The search condition receiving unit receives a search condition from a user. The cluster extracting unit extracts clusters suitable for the search condition on the basis of a node group matching the search condition received from the user and the attribution degree information. The partial network cutting unit cuts a partial network formed by a node group belonging to the clusters extracted by the cluster extracting unit from the network. The importance calculating unit calculates importance of each node on the partial network by executing an operation of a personalized PageRank algorithm having the node group matching the search condition as a seed vector for the cut partial network. The importance calculating unit generates a search result for the user regarding the search condition on the basis of the calculated importance.

Japanese Patent No. 6511971 describes an information processing apparatus that generates communities of network information having content varying over time on the basis of the amount of calculation in accordance with the number of occurrences of an event. The information processing apparatus includes a first network information acquisition unit, a second network information acquisition unit, a first community generation unit, and a second community generation unit. The first network information acquisition unit acquires first network information including multiple event nodes and event links that each connect one pair of event nodes involved with an event among the multiple event nodes. The second network information acquisition unit acquires second network information including multiple event nodes, multiple time nodes, and at least two time links each connecting one pair of event nodes and time nodes indicating a time of occurrence of the event. The first community generation unit generates one or more first communities to which the multiple event nodes belong, for the first network information, using a probability distribution in a case where there is movement between the multiple event nodes along the event link. The second community generation unit generates one or more second communities to which the multiple event nodes and the multiple time nodes belong, for the second network information, using a probability distribution in a case of movement along the time link between node groups each composed of the multiple event nodes and the multiple time nodes.

SUMMARY

To date, when multiple nodes constituting a network undergoes clustering, only the final result of the clustering is acquired. Since the network transient states on the way to the final result are not considered in the final result, a possible clustering target node in the network is not detected in some cases.

Aspects of non-limiting embodiments of the present disclosure relate to an information processing apparatus and a non-transitory computer readable medium for the same, the information processing apparatus enabled to reduce the detection omission of a possible clustering target node in clustering of multiple nodes constituting a network as compared to the use of only the final result of the clustering.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to acquire information regarding multiple transient states of a network including multiple nodes when the network undergoes clustering in which the multiple nodes are classified into multiple clusters. The multiple transient states each represent a transient state of the network on a way to a final result of the clustering. The processor is also configured to determine a common node by using the information regarding the acquired multiple transient states. The common node is used in the clustering in the multiple transient states.

BRIEF DESCRIPTION OF THE DRAWINGS

An exemplary embodiment of the present disclosure will be described in detail based on the following figures, wherein:

FIG. 6 is a diagram illustrating an example probability model of cluster belonging probabilities according to the exemplary embodiment representing transient states of a network;

FIG. 7 is a flowchart illustrating example flow of a process executed in accordance with an information processing program according to the exemplary embodiment; and FIG. 8 is a flowchart illustrating example process flow of an optimization algorithm according to the exemplary embodiment.

DETAILED DESCRIPTION

Hereinafter, an example mode for implementing the present disclosure will be described in detail with reference to the drawings.

Figure 1:
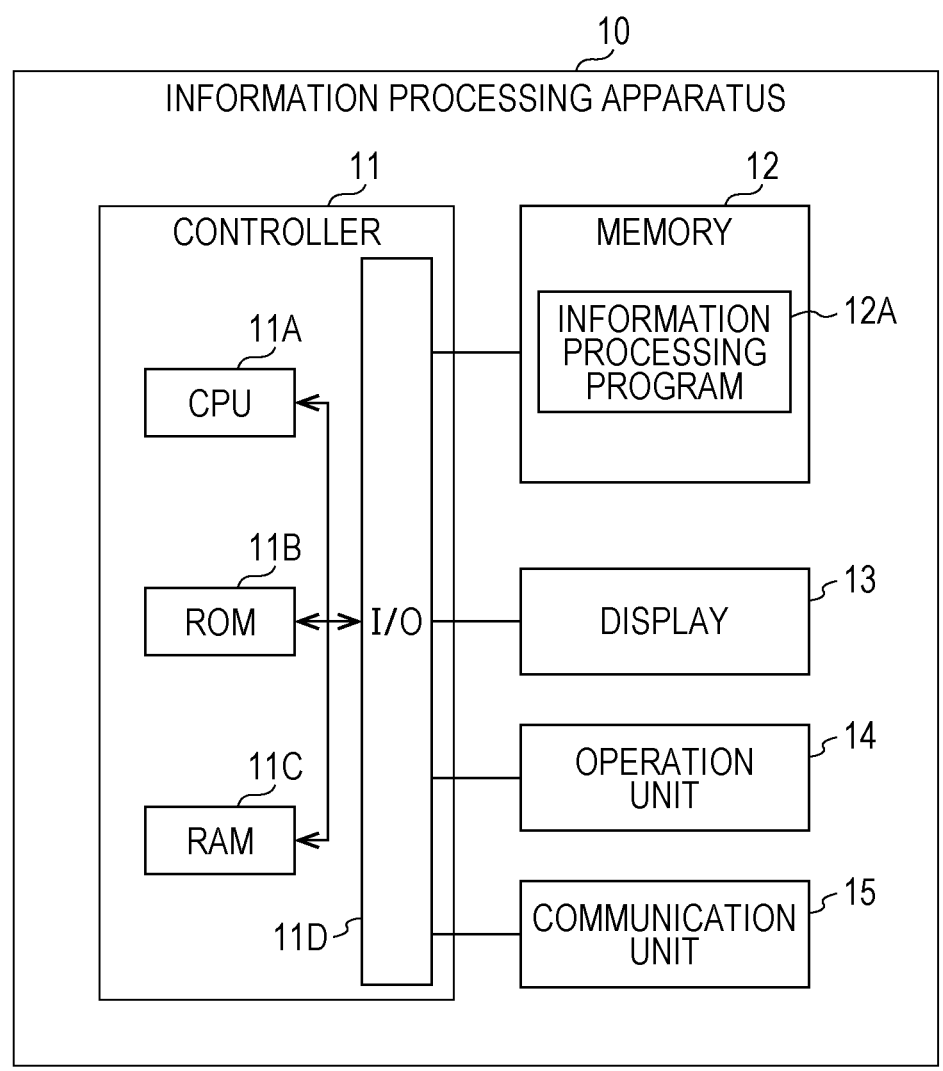
FIG. 1 is a block diagram illustrating an example electrical configuration of an information processing apparatus according to an exemplary embodiment.

FIG. 1 is a block diagram illustrating an example electrical configuration of an information processing apparatus 10 according to this exemplary embodiment.

As illustrated in FIG. 1, the information processing apparatus 10 according to this exemplary embodiment includes a controller 11, a memory 12, a display 13, an operation unit 14, and a communication unit 15.

A general computer such as a server computer or a personal computer (PC) applies to the information processing apparatus 10 according to this exemplary embodiment. A portable terminal apparatus such as a smartphone or a tablet terminal may also apply to the information processing apparatus 10.

The controller 11 includes a central processing unit (CPU) 11A, a read only memory (ROM) 11B, a random access memory (RAM) 11C, and an input/output interface (I/O) 11D, and these components are connected to each other via a bus.

Functional units including the memory 12, the display 13, the operation unit 14, and the communication unit 15 are connected to the I/O 11D. These functional units are able to mutually communicate with the CPU 11A via the I/O 11D.

The controller 11 may be configured as a sub-controller that controls part of the operation of the information processing apparatus 10 or may be configured as part of a main controller that controls the overall operation of the information processing apparatus 10. For example, an integrated circuit (IC) using, for example, large scale integration (LSI) technology or an IC chipset is used for part or all of the blocks of the controller 11. Circuits may be used for the respective blocks, or a circuit having part or all of the blocks integrated thereinto may be used. The blocks may be integrated into one, or some blocks may be provided separately. In addition, part of each block may be provided separately. For the integration of the controller 11, not only the LSI technology but also a dedicated circuit or a general-purpose processor may be used.

As the memory 12, for example, a hard disk drive (HDD), a solid state drive (SSD), or a flash memory is used. The memory 12 stores an information processing program 12A for performing information processing according to this exemplary embodiment. The information processing program 12A may also be stored in the ROM 11B.

The information processing program 12A may be installed in advance, for example, on the information processing apparatus 10. The information processing program 12A may be implemented in such a manner as to be stored in a nonvolatile storage medium or distributed through a network and then to be installed appropriately on the information processing apparatus 10. As an example of the nonvolatile storage medium, a compact disc read only memory (CD-ROM), a magneto-optical disk, a HDD, a digital versatile disc read only memory (DVD-ROM), a flash memory, a memory card, or the like is conceivable.

As the display 13, for example, a liquid crystal display (LCD), an organic electro luminescence (EL) display, or the like is used. The display 13 may have a touch panel integrated thereinto. The operation unit 14 is provided with a device for operation input such as a keyboard or a mouse. The display 13 and the operation unit 14 receive various instructions from a user of the information processing apparatus 10. The display 13 displays various pieces of information such as the result of a process executed in accordance with an instruction received from the user and a report of the process.

The communication unit 15 is connected to a network such as the Internet, a local area network (LAN), or a wide area network (WAN) and is able to communicate with an external apparatus such as an image forming apparatus or a different PC via the network.

Figure 2:
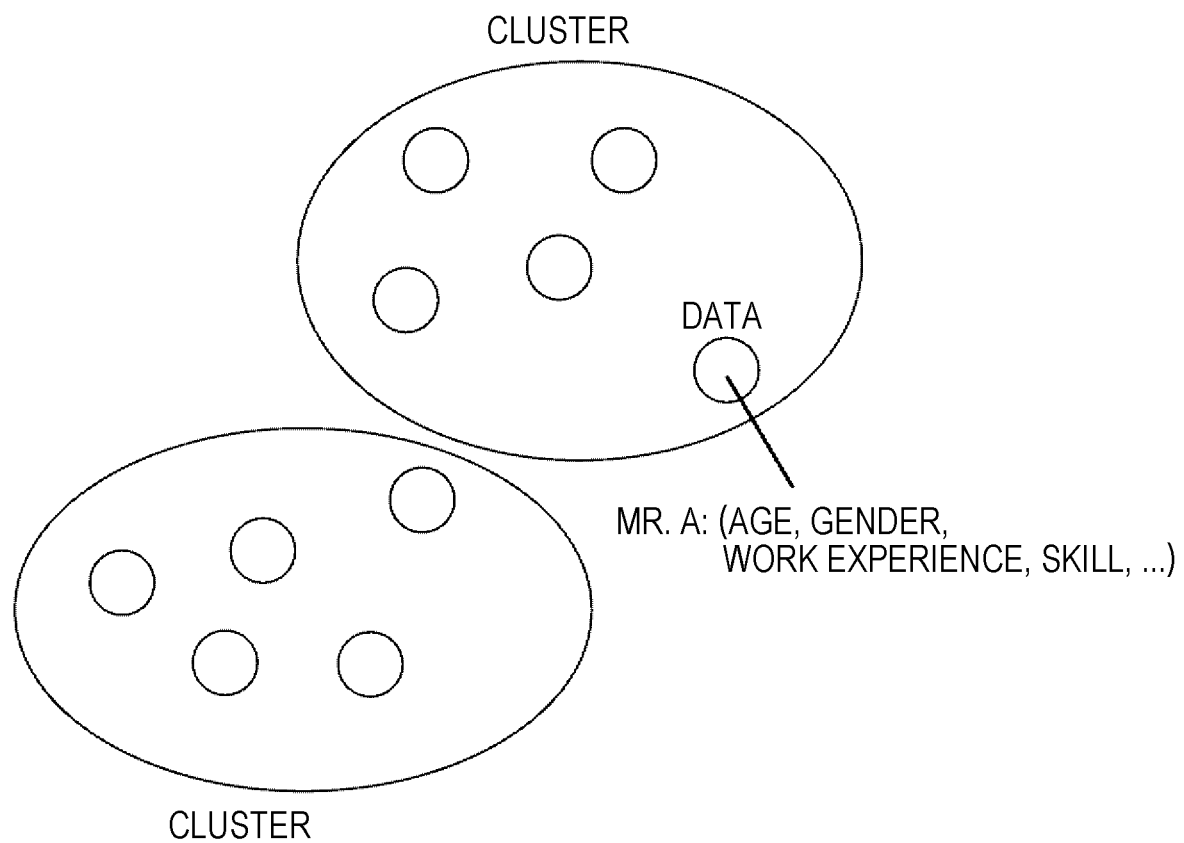
FIG. 2 is a diagram for explaining a clustering process according to the exemplary embodiment.

FIG. 2 is a diagram for explaining a clustering process according to this exemplary embodiment.

As illustrated in FIG. 2, the term "cluster" denotes a group of pieces of data (also referred to as nodes) having similar characteristics, and the term "clustering" denotes classifying a large number of pieces of data into multiple clusters.

For example, when data is vector data representing the feature of a person, the clustering described above denotes finding a group of persons having similar features. Examples of a clustering method for the vector data include the k-means method, the gaussian mixture model (GMM) method, and Ward's method.

Figure 3:
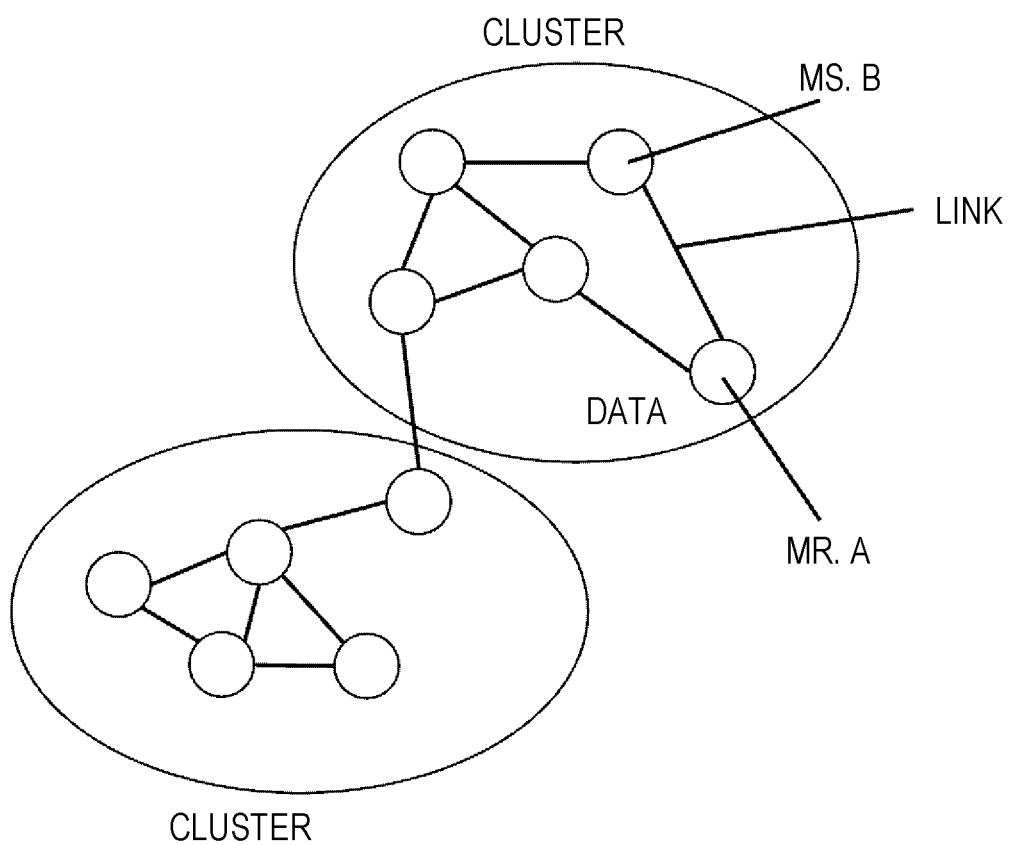
FIG. 3 is a diagram for explaining a network clustering process according to the exemplary embodiment.

FIG. 3 is a diagram for explaining the clustering process executed on the network according to this exemplary embodiment.

As illustrated in FIG. 3, network data is data representing connection (a link) between pieces of data (nodes).

Examples of the network include a network that represents a human relationship by connecting persons who communicates with each other by e-mail or telephone and a network that represents a reference relationship by connecting documents that reference another document and that are referenced. Examples of a network data clustering method include the so-called modular decomposition of Markov chain (MDMC) method described in Japanese Unexamined Patent Application Publication No. 2016-29526, the Louvain method, and the Infomap method.

Note that a cluster particularly in a network is also referred to as a community. In addition, the clustering of nodes in the network is also referred to as a community analysis, and, for example, the Louvain method and the Infomap method that are described above are used for the community analysis. A probability model in which an agent walks around the network through links is applied to this exemplary embodiment, and the movement of the agent is referred to as random walk.

As described above, transient states of the network on the way to the final result of the clustering are not considered in the final result, and thus a possible clustering target node in the network is not detected in some cases.

Figure 4:
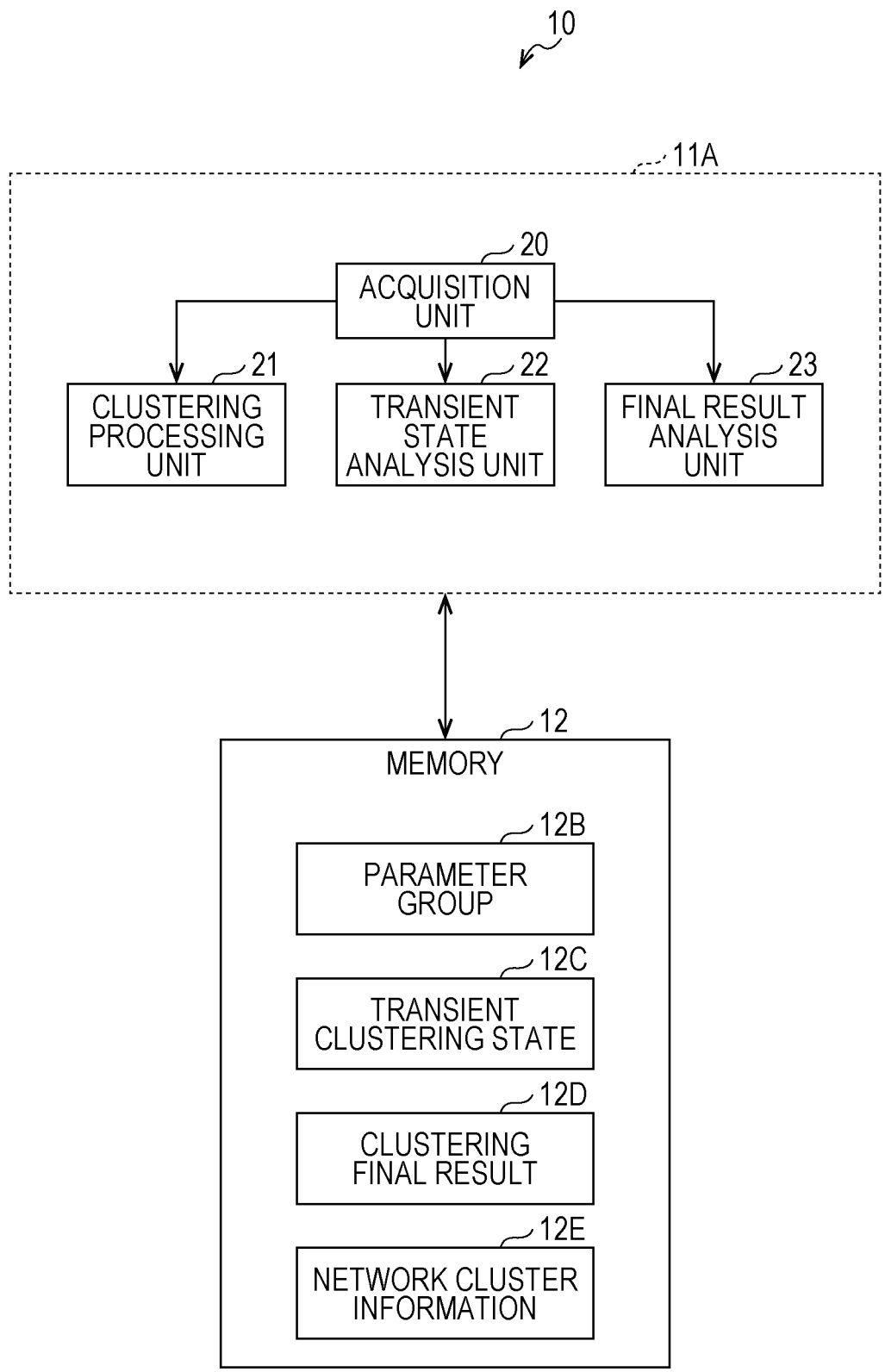
FIG. 4 is a block diagram illustrating an example functional configuration of the information processing apparatus according to the exemplary embodiment.

The CPU 11A of the information processing apparatus 10 according to this exemplary embodiment functions as components illustrated in FIG. 4 in such a manner that the information processing program 12A stored in the memory 12 is loaded in the RAM 11C and then is run. The CPU 11A is an example of a processor.

FIG. 4 is a block diagram illustrating an example functional configuration of the information processing apparatus 10 according to this exemplary embodiment.

As illustrated in FIG. 4, the CPU 11A of the information processing apparatus 10 according to this exemplary embodiment functions as an acquisition unit 20, a clustering processing unit 21, a transient state analysis unit 22, and a final result analysis unit 23.

The memory 12 according to this exemplary embodiment stores therein a parameter group 12B, a transient clustering state 12C, a clustering final result 12D, and network cluster information 12E. The parameter group 12B includes network information, granularity α, and mixing η that are needed for the clustering. The granularity α and the mixing η are hyper-parameters.

The network information is an example of information regarding multiple nodes and multiple links connecting the multiple nodes. For example, hypertext markup language (HTML) data representing mutual reference, friendship data, and the like are applied to the network information. It suffices that the network information indicates at least a relationship of a linkage between nodes (a relationship between a node and a link). The network information does not have to indicate specific content of the node (such as the content of HTML data).

The granularity α is a variable for determining the sizes of clusters into which the multiple nodes are classified and is expressed as a positive real number. In this exemplary embodiment, the granularity α is stored in advance in the memory 12; however, the user may input the granularity α with the operation unit 14.

The mixing η is a variable for determining the state of the mixing distribution of a cluster and is also a variable for determining the degree of importance (a degree of importance π described later) of a cluster. If the degree of importance π is obtained in advance, the mixing η may be omitted. In this exemplary embodiment, the mixing η is stored in advance in the memory 12; however, the user may input the mixing η with the operation unit 14.

Figure 5:
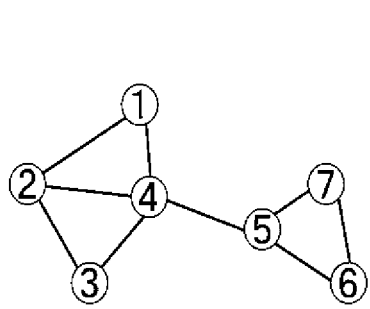
FIG. 5 is a diagram illustrating example network information according to the exemplary embodiment.

FIG. 5 is a diagram illustrating an example of the network information according to this exemplary embodiment.

The network information illustrated in FIG. 5 has information regarding, for example, seven nodes and nine links.

The nodes illustrated in FIG. 5 are assigned node numbers from 1 to 7, and, for example, the node with node number 1 (hereinafter, expressed as the node [1]) has links with the node [2] and the node [4], respectively. This exemplary embodiment describes the case where the network has the seven nodes for simplicity. However, the number of nodes and the number of links may be larger than these numbers and may be, for example, about 100,000. In addition, each link connecting nodes is not a directed link in this exemplary embodiment, but the link may be a one-way link.

A matrix T illustrated in FIG. 5 represents transition probabilities in the case of random transitions between the nodes through the links. For example, in a case of a random transition from the node [1] as the starting point to another node through a link, probabilities of the transitions to the node [2] and the node [4] are ½ and ½, respectively. The first column of the matrix T represents the transition probabilities of these transitions. The other elements of the matrix T are also arranged in the same manner. Suppose a case where a matrix A is used in which $A_{nm}=1$ holds true in the presence of a linkage between a node [n] and a node [m] through a link and in which $A_{nm}=0$ holds true in the absence of the linkage, and where the total number of nodes is N. In this case, the matrix T is generally expressed by Formula (1) below. Since the total sum of the transition probabilities is 1, $\Sigma_n T_{nm}=1$ holds true for any node [m].

$$T_{nm} = \frac{A_{nm}}{\sum_{s=1}^{N} A_{sm}} \qquad (1)$$

From the memory 12, the acquisition unit 20 acquires the parameter group 12B and also acquires the transient clustering state 12C or the clustering final result 12D. The transient clustering state 12C is expressed as a probability model representing the transient states of the network on the way to the final result of the clustering. The clustering final result 12D is expressed as a probability model representing the final state of the network in the final result of the clustering.

The clustering processing unit 21 performs the clustering in which the multiple nodes included in the network are classified into multiple clusters. Specifically, the clustering processing unit 21 derives cluster belonging probabilities by using the parameter group 12B acquired by the acquisition unit 20. Each cluster belonging probability represents a probability at which one of the multiple links connecting the multiple nodes belongs to one of the multiple clusters. In a case where the number of links is D and the number of clusters is K, the cluster belonging probability is characterized by D K-dimensional probability distributions ($\gamma_{d=1, 2, \ldots, D}$). At this time, a k-th element $\gamma_{dk}$ in the K-dimensional probability distribution denotes a probability at which a link d belongs to a cluster k.

Specifically, the clustering processing unit 21 calculates a cluster belonging probability $\gamma^{(t)}_{dk}$ by using Formula (2) below. Note that t is a positive integer representing time. Specifically, the cluster belonging probability $\gamma^{(t)}_{dk}$ denotes a probability at which a link d belongs to a cluster k at time t.

$$\gamma^{(t)}_{dk} = \frac{\pi^{(t)}_{dk} Mult(\tau^{(t)}_{:d} | p^{(t)}(:|k))}{\sum_{k=1}^{K} \pi^{(t)}_{dk} Mult(\tau^{(t)}_{:d} | p^{(t)}(:|k))} \qquad (2)$$

Mult(x(:)|q(:)) denotes polynominal distribution (particularly categorical distribution with n=1). Mult(x(:)|q(:)) denotes a probability mass function having a result of $x_{n=1, 2, \ldots, N}$ in a case where the number of trials is 2 with N parameters ($q_{n=1, 2, \ldots, N}$ ($\Sigma_{n=1}^{N} q_n = 1$). Formula (3) below represents a general expression for the polynominal distribution.

$$Mult(x | q) = \frac{\sum_{n=1}^{N} x_n}{\prod_{n=1}^{N} x_n} \prod_{n=1}^{N} q^{x_n} \qquad (3)$$

Note that x is replaced with $\tau^{(t)}_{:d}$ in Formula (2) above, and q is replaced with $p^{(t)}(:|k)$ in Formula (2) above.

Note that $\pi^{(t)}_{dk}$ is a parameter representing the degree of importance of the cluster k (the cluster distribution of the link d) at the time t. The degree of importance $\pi^{(t)}_{dk}$ is calculated by using the aforementioned mixing $\eta(=\eta^{(t)})$ in accordance with Formula (4) below.

$$P(\pi_{dk}^{(t)}|\eta^{(t)}) = \text{Dir}(\pi_{dk}^{(t)}|\eta^{(t)})$$

P denotes a probability model; Dir, Dirichlet distribution; and $\eta^{(t)}$, the mixing parameter of the cluster at the time t. Formula (5) below represents a general expression for the Dirichlet distribution.

$$\text{Dir}(y|b) = \frac{\Gamma\left(\sum_{n=1}^{N} b_n\right)}{\prod_{n=1}^{N} \Gamma(b_n)} \prod_{n=1}^{N} y^{b_n - 1} \quad (5)$$

Note that $\Gamma$ denotes a gamma function, y is replaced with $\pi^{(t)}_{dk}$ in Formula (4) above, and b is replaced with $\eta^{(t)}$ in Formula (4) above.

Note that $p^{(t)}(:|k)$ denotes a classification proportion (the probability distribution of the agent) at the time t and is calculated by using the aforementioned granularity $\alpha(=\alpha^{(t)})$ in accordance with Formulas (6) and (7) below. The classification proportion $p^{(t)}(:|k)$ denotes a proportion in which one of the multiple nodes is classified as one of the clusters.

$$P(p^{(t)}|\alpha^{(t)}) = \prod_{k=1}^{K} \text{Dir}(p^{(t)}(:|k)|\alpha^{(t)}(:|k)) \quad (6)$$

$$\alpha^{(t)}(n|k) = \alpha_k^{(t)} \sum_{n=1}^{N} T_{nm} p^{(t-1)}(m|k) + 1 \quad (7)$$

P denotes a probability model; Dir, Dirichlet distribution; $\alpha^{(t)}$, a granularity parameter for the cluster at the time t; and $\alpha^{(t)}k$, a granularity parameter for the cluster k at the time t. The granularity $\alpha$ is a positive real number as described above. As $\alpha$ approaches to 0, the decomposition of the granularity becomes finer. As $\alpha$ approaches to infinity, the granularity of the decomposition becomes coarser. $T_{nm}$ denotes a transition probability, and $p^{(t-1)}p(m|k)$ denotes a classification proportion estimated immediately before the t-th classification proportion $p^{(t)}(n|k)$. Regarding the Dirichlet distribution, y in Formula (5) above is replaced with $p^{(t)}(:|k)$ in Formula (6) above, and b in Formula (5) above is replaced with $\alpha^{(t)}(:|k)$ in Formula (6) above.

Transit information at the time t is denoted by $\tau^{(t)}_{:d}$. The transit information $\tau^{(t)}_{:d}$ is information indicating a node passed in a random transition among multiple nodes through one of multiple links. The transit information $\tau^{(t)}_{:d}$ is acquired from the aforementioned network information. The transit information $\tau^{(t)}_{:d}$ represents a case where, for example, when a virtual agent randomly moves between nodes through a link, the virtual agent is found on the link connecting the node [n] and the node [m].

Note that the aforementioned transit information $\tau^{(t)}_{:d}$ is calculated, for example, on the following bases: $\tau^{(t)}_{nd}=1$ for the node [n] selected on the basis of a stationary probability distribution $p^{st}(n)$ in random transitions between nodes in the network; and $\tau^{(t)}_{md}=1$ for the node [m] selected on the basis of $T_{nm}$ providing a probability of transition to the node [m] from the node [n] as the starting point. Such an N-dimensional vector is generated D times. The transit information $\tau^{(t)}_{nd}$ has an amount satisfying $\Sigma_n \tau^{(t)}_{nd}=2$.

The aforementioned stationary probability distribution $p^{st}(n)$ is obtained by reducing simultaneous N-th degree equations based on Formula (8) below. The stationary probability distribution $p^{st}(n)$ is the eigenvector of the matrix T, and the eigenvalue is 1.

$$p^{st}(n) = \sum_{m=1}^{N} T_{nm} p^{st}(m) \quad (8)$$

Note that a network including a one-way link has trouble such as a so-called rank sink in some cases, and thus only a specific node has a value in the stationary probability distribution. In such a case, Formula (7) above may be modified, and the stationary probability distribution $p^{st}(n)$ may be obtained by using, for example, the relation $p^{st}(n) = (1-r)\Sigma_m T_{nm} p^{st}(m) + r$. Note that r is a real number from 0 to 1 and represents a probability of a random transition between nodes without passing through a link.

The clustering processing unit 21 stores, in the memory 12, multiple transient states representing the transient states of the network on the way to the final result of the clustering, as the transient clustering state 12C. The transient clustering state 12C is expressed, for example, as the cluster belonging probability $\gamma^{(t)}_{dk}$ at the time t.

The probability model of cluster belonging probabilities $\gamma^{(t)}_{dk}$ representing the transient states of the network will be described with reference to FIG. 6.

FIG. 6 is a diagram illustrating an example of the probability model of the cluster belonging probabilities $\gamma^{(t)}dk$ according to this exemplary embodiment representing the transient states of the network.

The example in FIG. 6 illustrates the probability model of cluster belonging probabilities $\gamma^{(t)}_{dk}$ at time t=1, the probability model of cluster belonging probabilities $\gamma^{(t)}_{dk}$ at time t=3, and the probability model of cluster belonging probabilities $\gamma^{(t)}_{dk}$ at time t=50. For simplicity of explanation, the probability model of the cluster belonging probabilities $\gamma^{(t)}_{dk}$ at the time t=50 is the final result of the clustering.

In the example in FIG. 6, a cluster K1 is generated in the probability model of the cluster belonging probabilities $\gamma^{(t)}_{dk}$ at the time t=1. The cluster K1 includes nodes n1 to n3 but does not include a node n4. In the probability model of the cluster belonging probabilities $\gamma^{(t)}_{dk}$ at the time t=3, a cluster K3 is generated. The cluster K3 includes the nodes n1 to n4. In the probability model of the cluster belonging probabilities $\gamma^{(t)}_{dk}$ at the time t=50, a cluster K50 is generated. The cluster K50 includes the nodes n3 and n4 but does not include the nodes n1 and n2.

That is, as the result of clustering, the network includes a cluster present in a transient state but not present in the final result in some cases. According to this exemplary embodiment, the transient states of the network on the way to the final result are stored, and detection omission of a node possible clustering target node in the network, that is, a node of importance for the network is reduced.

The transient state analysis unit 22 acquires information regarding multiple transient states of the network from the transient clustering state 12C and determines a common node used in the clustering in the multiple transient states by using the information regarding the multiple acquired transient states. The common node is herein, for example, a node that is used in clustering with frequency higher than a threshold and that is of importance for the network. A cluster including a common node, for example, is not present in the final result of the clustering but present only in at least one transient state. In the example in FIG. 6, the nodes n1 to n3 are common nodes in each of the transient state at the time t=1 and the transient state at the time t=3. In addition, each of the cluster K1 and the cluster K3 respectively included in the transient states at the time t=1 and at the time t=3 is not present in the final result at the time t=50.

The information regarding the aforementioned transient state is expressed as a parameter described, for example, in a cluster belonging probability $\gamma^{(t)}{}_{dk}$. The parameter herein includes at least one of the classification proportion $p^{(t)}(:|k)$, the granularity $\alpha^{(t)}$, and the degree of importance $\pi^{(t)}{}_{dk}$ that are described above. As described above, the cluster belonging probability $\gamma^{(t)}{}_{dk}$ is calculated by using the classification proportion $p^{(t)}(:|k)$, the transit information $\tau^{(t)}{}_{:d}$, and the degree of importance $\pi^{(t)}{}_{dk}$ in accordance with Formula (2) above.

The granularity $\alpha^{(t)}$ at the time t is acquired and analyzed, and thereby the size of a cluster at the time t is determined. The classification proportion $p^{(t)}(:|k)$ at the time t is acquired and analyzed, and thereby a mainly composing node in the cluster at the time t is determined. The degree of importance $\pi^{(t)}{}_{dk}$ at the time t is acquired and analyzed, and thereby a cluster of importance at the time t is determined. The cluster belonging probability $\gamma^{(t)}{}_{dk}$ at the time t is acquired and analyzed, and thereby a quasi-stable cluster not present in the final result at the time t is determined. The term "quasi-stable cluster" denotes a cluster ranking next to a cluster in the final result in a case where the cluster in the final result is a stable cluster. A change between the cluster belonging probabilities $\gamma^{(t)}{}_{dk}$ is preferably extracted in a transient state at time earlier than predetermined time and a transient state at time later than the predetermined time, among the multiple transient states.

The classification proportion $p^{(t)}(:|k)$ is preferably extracted in a transient state at time later than the predetermined time among the multiple transient states. This is because a node having the classification proportion $p^{(t)}(:|k)$ in a transient state closer to the final result of the clustering has a higher probability at which the node is a mainly composing node in the cluster. Note that, for example, time at the middle point between the start time and the end time in the clustering may be applied to the predetermined time.

The granularity $\alpha^{(t)}$ is preferably extracted in a transient state at time earlier than the predetermined time among the multiple transient states. This is because the size of the cluster is determined almost immediately after the start of the clustering in many cases. Note that, for example, time at the middle point between the start time and the end time in the clustering may be applied to the predetermined time.

The transient state analysis unit 22 may restore the transient states of the network by using the aforementioned parameters and cause the clustering processing unit 21 to perform additional clustering by using time in a transient state as the starting point. The number of steps needed for clustering optimization may be estimated from the transient state at each time.

The clustering processing unit 21 stores, in the memory 12, a final result obtained from the clustering including the additional clustering, as the clustering final result 12D.

The final result analysis unit 23 acquires various parameters regarding the final state of the network from the clustering final result 12D and analyzes the various parameters regarding the acquired final state. By analyzing the various parameters, the size of a cluster in the final state of the network, a mainly composing node in the cluster, the stability of the cluster, and the like are determined. The final result analysis unit 23 stores the analysis result as the network cluster information 12E in the memory 12. The analysis result obtained by the transient state analysis unit 22 may also be stored as the network cluster information 12E in the memory 12.

The actions of the information processing apparatus 10 according to this exemplary embodiment will be described with reference to FIG. 7.

FIG. 7 is a flowchart illustrating example flow of a process executed in accordance with the information processing program 12A according to this exemplary embodiment.

First, the information processing apparatus 10 is instructed to execute a clustering process, and the CPU 11A then starts the information processing program 12A to perform the following steps.

In step S100 in FIG. 7, the CPU 11A acquires the parameter group 12B from the memory 12. The parameter group 12B includes the network information, the granularity $\alpha$, and the mixing $\eta$ that are needed for the clustering, as described above.

In step S101, the CPU 11A starts the clustering in which the multiple nodes are classified into multiple clusters in the network. Specifically, the CPU 11A calculates each cluster belonging probability $\gamma^{(t)}{}_{dk}$ at the time t by using Formulas (2) to (7) above.

In step S102, the CPU 11A stores, in the memory 12, the cluster belonging probabilities $\gamma^{(t)}{}_{dk}$ obtained by the calculation in step S101 and representing the multiple transient states of the network, as the transient clustering state 12C.

In step S103, the CPU 11A analyzes the transient clustering state 12C stored in step S102. Specifically, the CPU 11A acquires information regarding multiple transient states of the network from the transient clustering state 12C and determines common nodes used for the clustering in the multiple transient states by using the information regarding the acquired multiple transient states. The information regarding the transient state is expressed, for example, as a parameter described in the cluster belonging probabilities $\gamma^{(t)}{}_{dk}$, as described above. The parameter includes at least one of the classification proportion $p^{(t)}(:|k)$, the granularity $\alpha^{(t)}$, and the degree of importance $\pi^{(t)}{}_{dk}$ that are described above.

In step S104, the CPU 11A stores, in the memory 12, the cluster belonging probabilities $\gamma^{(t)}{}_{dk}$ on which the analysis result of the multiple transient states in step S103 is reflected, as the clustering final result 12D.

In step S105, the CPU 11A analyzes the clustering final result 12D stored in step S104 and thereby acquires the final analysis result.

In step S106, the CPU 11A stores the final analysis result acquired in step S105 as the network cluster information 12E in the memory 12.

In step S107, the CPU 11A terminates the clustering performed on the network and thus terminates a series of steps of the process executed in accordance with the information processing program 12A.

An optimization algorithm according to this exemplary embodiment will be described specifically with reference to FIG. 8. The optimization algorithm is an algorism for optimizing (maximizing) a likelihood function in the course of estimation of parameters included in the probability model from the network.

FIG. 8 is a flowchart illustrating example process flow of the optimization algorithm according to this exemplary embodiment.

In the step on the first line in FIG. 8, the CPU 11A initializes parameters $p^{(0)}$, $\alpha^{(1)}$, and $\eta^{(1)}$ in the probability model. Note that $p^{(0)}$ is a parameter representing a classification proportion; $\alpha^{(1)}$, granularity; and $\eta^{(1)}$, mixing.

In the step on the second line, the CPU 11A sets time $t(t=1, 2, \ldots, T_{step})$ for deriving the probability model.

In the step on the third line, the CPU 11A initializes probability variables $z^{(t)}$, $p^{(t)}$, and $\pi^{(t)}$. Note that $p^{(t)}$ is a parameter representing a classification proportion at time t; $\pi^{(t)}$, the degree of importance at the time t; and $z^{(t)}$, a latent variable at the time t. There are relations as Formulas (9) and (10) below.

$$P(z_{dk}^{(t)}=1|\pi_{dk}^{(t)})=\pi_{dk}^{(t)} \tag{9}$$

$$P(\tau_{:d}^{(t)}|z_{dk}^{(t)}=1, p^{(t)})=\text{Mult}(\tau_{:d}^{(t)}|p^{(t)}(:|k)) \tag{10}$$

P denotes a probability model; Mult, polynominal distribution (categorical distribution); $z^{(t)}_{dk}$, a latent variable at the time t; d, a link; k, a cluster; $\pi^{(t)}_{dk}$, the degree of importance at the time t; $\tau^{(t)}_{:d}$, transit information at the time t; and $p^{(t)}(:|k)$, a classification proportion at the time t.

In the step on the fourth line, the CPU 11A sets a sample $(s=1, 2, \ldots, S)$ for sampling.

In the step on the fifth line, the CPU 11A sets a cluster k $(k=1, 2, \ldots, K)$ for the clustering.

In the step on the sixth line, the CPU 11A samples a classification proportion (probability distribution) $p^{(t)}(:|k)$ from the Dirichlet distribution of a granularity parameter $\alpha^{(t)}(:|k)+(\tau z)^{(t)}:k$. For the sampling, for example, Formulas (6), (7), (9), and (10) above are used. Note that $(\tau z)^{(t)}_{:k}$ is a parameter obtained by multiplying transit information $\tau^{(t)}_{:k}$ by a latent variable $z^{(t)}_{dk}$.

In the step on the seventh line, the CPU 11A sets a link d $(d=1, 2, \ldots, K)$ for the clustering.

In the step on the eighth line, the CPU 11A samples a degree of importance (mixing probability distribution) $\pi^{(t)}_{dk}$ from the Dirichlet distribution of a mixing parameter $\eta^{(t)}+z^{(t)}_{dk}$. For the sampling, for example, Formulas (6), (7), (9), and (10) above are used.

In the step on the ninth line, the CPU 11A samples an element k of the latent variable $z^{(t)}_{dk}$ from the categorical distribution of a cluster belonging probability $\gamma^{(t)}_{dk}$. For the sampling, for example, Formula (2) above is used.

In the step on the tenth line, the CPU 11A estimates the classification proportion (probability distribution) $p^{(t)}(:|k)$ by using Formula (11) below, where $p^{(t)}_{:s}$ is an instance in the sample s.

$$p^{(t)} = \frac{1}{S}\sum_{s=1}^{S} p^{(t)}_{:s} \tag{11}$$

In the step on the eleventh line, the CPU 11A updates hyper-parameters $\alpha^{(t+1)}$ and $\eta^{(t+1)}$ to maximize the likelihood function.

In the step on the twelfth line, the CPU 11A stores, in the memory 12, a classification proportion $p^{(t)}$ and the hyper-parameters $\alpha^{(t+1)}$ and $\eta^{(t+1)}$ as information regarding the transient states at the time t and terminates the optimization algorithm.

According to this exemplary embodiment as described above, when the clustering of multiple nodes constituting the network is performed, detection omission of a possible clustering target node, that is, a node of importance for the network, is reduced.

In the embodiment above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The information processing apparatus according to the exemplary embodiment has heretofore been illustrated and described. In a mode of the exemplary embodiment, the exemplary embodiment may be a program causing a computer to implement the functions of the components of the information processing apparatus. The exemplary embodiment may be a non-transitory storage medium readable by the computer storing the program.

The configuration of the information processing apparatus described for the exemplary embodiment above is an example and may be modified in accordance with the circumstances without departing from the spirit of the exemplary embodiment.

The flow of the processing performed in accordance with the program described for the aforementioned exemplary embodiment is also an example. A deletion of an unnecessary step, an addition of a new step, a change of the order of the steps, and the like may be performed without departing from the spirit of the exemplary embodiment.

The case where the program is run and thereby the processing according to the exemplary embodiment is implemented by using the computer and the software configuration therefore has heretofore been described for the exemplary embodiment above; however, the exemplary embodiment is not limited to this case. The exemplary embodiment may be implemented by, for example, a hardware configuration and combination of the hardware configuration and the software configuration.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to
   acquire information regarding a plurality of transient states of a network including a plurality of nodes when the network undergoes clustering in which the plurality of nodes are classified into a plurality of clusters, the plurality of transient states each representing a transient state of the network on a way to a final result of the clustering;
   perform additional clustering using time in the plurality of transient states as a starting point; and determine a final state including a common node by using the information regarding the acquired plurality of transient states including the additional clustering, the common node being used in the clustering in the plurality of transient states.

2. The information processing apparatus according to claim 1,
wherein the common node is one of the nodes that is used in the clustering with frequency higher than a threshold.

3. The information processing apparatus according to claim 2,
wherein a cluster of the clusters that includes the common node is not present in the final result of the clustering but is present only in at least one of the transient states.

4. The information processing apparatus according to claim 1,
wherein the information regarding the transient states is expressed as a parameter described in cluster belonging probabilities each representing a probability at which one of a plurality of links connecting the plurality of nodes belongs to one of the plurality of clusters.

5. The information processing apparatus according to claim 2,
wherein the information regarding the transient states is expressed as a parameter described in cluster belonging probabilities each representing a probability at which one of a plurality of links connecting the plurality of nodes belongs to one of the plurality of clusters.

6. The information processing apparatus according to claim 3,
wherein the information regarding the transient states is expressed as a parameter described in cluster belonging probabilities each representing a probability at which one of a plurality of links connecting the plurality of nodes belongs to one of the plurality of clusters.

7. The information processing apparatus according to claim 4,
wherein the parameter includes at least one of a classification proportion, granularity, and a degree of importance, the classification proportion representing a proportion in which one of the plurality of nodes is classified as one of the clusters, the granularity being a variable for determining respective sizes of the plurality of clusters into which the plurality of nodes are classified, the degree of importance being provided regarding each of the plurality of clusters.

8. The information processing apparatus according to claim 5,
wherein the parameter includes at least one of a classification proportion, granularity, and a degree of importance, the classification proportion representing a proportion in which one of the plurality of nodes is classified as one of the clusters, the granularity being a variable for determining respective sizes of the plurality of clusters into which the plurality of nodes are classified, the degree of importance being provided regarding each of the plurality of clusters.

9. The information processing apparatus according to claim 6,
wherein the parameter includes at least one of a classification proportion, granularity, and a degree of importance, the classification proportion representing a proportion in which one of the plurality of nodes is classified as one of the clusters, the granularity being a variable for determining respective sizes of the plurality of clusters into which the plurality of nodes are classified, the degree of importance being provided regarding each of the plurality of clusters.

10. The information processing apparatus according to claim 7,
wherein the processor calculates each cluster belonging probability by using the degree of importance, the classification proportion, and a plurality pieces of transit information each indicating one of the plurality of nodes that is passed in a random transition among the plurality of nodes through one of the plurality of links.

11. The information processing apparatus according to claim 8,
wherein the processor calculates each cluster belonging probability by using the degree of importance, the classification proportion, and a plurality pieces of transit information each indicating one of the plurality of nodes that is passed in a random transition among the plurality of nodes through one of the plurality of links.

12. The information processing apparatus according to claim 9,
wherein the processor calculates each cluster belonging probability by using the degree of importance, the classification proportion, and a plurality pieces of transit information each indicating one of the plurality of nodes that is passed in a random transition among the plurality of nodes through one of the plurality of links.

13. The information processing apparatus according to claim 7,
wherein the classification proportion is extracted in a transient state at time later than predetermined time among the plurality of transient states.

14. The information processing apparatus according to claim 10,
wherein the classification proportion is extracted in a transient state at time later than predetermined time among the plurality of transient states.

15. The information processing apparatus according to claim 7,
wherein the granularity is extracted in a transient state at time earlier than predetermined time among the plurality of transient states.

16. The information processing apparatus according to claim 10,
wherein the granularity is extracted in a transient state at time earlier than predetermined time among the plurality of transient states.

17. The information processing apparatus according to claim 4,
wherein a change between the cluster belonging probabilities is extracted in a transient state at time earlier than predetermined time and a transient state at time later than the predetermined time, among the plurality of transient states.

18. The information processing apparatus according to claim 7,
wherein a change between the cluster belonging probabilities is extracted in a transient state at time earlier than predetermined time and a transient state at time later than the predetermined time, among the plurality of transient states.

19. The information processing apparatus according to claim 10,
wherein a change between the cluster belonging probabilities is extracted in a transient state at time earlier than predetermined time and a transient state at time later than the predetermined time, among the plurality of transient states.

20. A non-transitory computer readable medium storing a program causing a computer to execute a process for information processing, the process comprising:
- acquiring information regarding a plurality of transient states of a network including a plurality of nodes when the network undergoes clustering in which the plurality of nodes are classified into a plurality of clusters, the plurality of transient states each representing a transient state of the network on a way to a final result of the clustering;
- performing additional clustering using time in the plurality of transient states as a starting point; and
- determining a final state including a common node by using the information regarding the acquired plurality of transient states including the additional clustering, the common node being used in the clustering in the plurality of transient states.

* * * * *